UNITED STATES PATENT OFFICE.

JOSEPH MOSES WARD KITCHEN, OF EAST ORANGE, NEW JERSEY.

FOOD COMPOSITION.

1,230,091. Specification of Letters Patent. Patented June 12, 1917.

No Drawing. Application filed November 20, 1916. Serial No. 132,288.

*To all whom it may concern:*

Be it known that I, JOSEPH MOSES WARD KITCHEN, a citizen of the United States, residing in the city of East Orange, county of Essex, and State of New Jersey, have invented Improvements in Food Compositions, of which the following is a specification.

The object of the present invention, which is a continuation of my copending application, Sr. No. 872,707, is to provide for a commercial and economical utilization of skim milk as human food, as well as to produce an excellent table beverage of improved hygienic character, of low cost, agreeable gustatory quality and well balanced as to its nutritive constituents.

In my application for patent, Sr. No. 740,963, which was filed January 9, 1913, and has developed into Patent No. 1,125,692, I refer to chocolate as a desirable addition to skim milk in making food compositions, the addition of which confers improved hygienic and gustatory quality to skim milk through replacement of the butter fat that has been removed from the milk in its skimming, by an equivalent amount of fat—that of the vegetable fat in the chocolate, which addition also confers a chocolate flavor to the milk. In that patent I lay stress on the idea of nutritively re-balancing skim milk with fat, by the addition of food materials rich in fat other than milk, in which the fat is not disassociated from the fibrous tissue of the material used, which condition of retained fat association prevents the occurrence of rancidity in the composition. In my Patent No. 1,127,778, I describe a preferred method of dehydrating fluid food compositions through which successive layers of fluid are dried upon a nucleus, at moderate temperatures, which moderate application of heat largely prevents changes in the digestibility of the food that ordinarily occurs when exposed to higher temperatures in the drying process.

The present application has for purpose, specifically claiming several novel inventive ideas that were more or less disclosed in the referred to patents; as well as other related ideas. It specifically claims a method, and a product containing a cocoa preparation made by the method, which in constitution is much as described in the cited patents.

The general idea of utilizing admixed skim milk and a cocoa constituent is old; but the advance I have evolved, I believe, is new. In this case, when reference is made to a cocoa preparation, a preparation of the entire cocoa seed, such as forms of pulverized chocolate, is meant.

The making of food compositions of chocolate or other preparations of cocoa and whole milk, is commonly practised; but such compositions besides being more costly than my composition, have too large a fat content to be hygienically desirable. I overcome that objection by using skim milk instead of whole milk, and thus secure a lessened cost, as well as an increased hygienic-dietetic value. To secure a commercially desirable product, I partly dehydrate the skim milk, either before or after admixing it and the chocolate or other cocoa preparation and other admixed constituent, which may be sugar, starchy cereals or flavoring matter; and from such admixed materials, I make partly fluid, solid, or dry powdered compositions, packaged in various known incasements. The partly fluid, condensed form, is preferably incased in hermetically sealed tins, the solid form in soft paper, and the powdered form in stiff cardboard incasements or non-hermetically sealed sheet metal packages. All of these forms should be sterilized against fermentative action, after being packaged.

In preparing any composition of this character, I prefer that the skim milk and cocoa preparation should be partly dehydrated under a reduced atmospheric pressure, as I do not pre-digest my milk. The composition thus produced has only been subjected to a limited extent to a degree of heat that reduces digestibility in the product. My method secures better results as compared with compositions entirely dried under high heat. My next preferred method is to dry such compositions as are herein claimed, under the method described in my Patent No. 1,127,778. However, I do not confine myself to any special method of dehydrating the skim milk or in pulverizing or in otherwise preparing the cocoa constituent of the composition. The cocoa constituent may be partly deprived of its naturally contained fat if desired, in order to secure a maximum gustatory flavoring effect from the cocoa constituent, and yet avoid an undesirable presence of fat in the composition. In cow's milk of average composition the various food constituents are present in desirable proportions; hence I prefer, in making my compositions, to imitate the nutritive proportions of the solids found in cow's milk of average character as to its food constituents.

I do not confine myself to any degree of dehydration of the skim milk, or definite proportions of cocoa or chocolate that I add to the skim milk; other than enough is added to make good the butter fat that has been removed from the milk.

I may admix dry powdered skim milk with powdered chocolate or cocoa in my compositions, the base of which is normal undigested skim milk as a rule. I use any preparation made from cocoa seeds that is designated as cocoa, chocolate, broma, or that may be otherwise named; except so-called cocoa-butter that has been disassociated from the fibrous tissue of the cocoa seed; for I prefer to use, especially in dry compositions, a preparation of cocoa that retains its fatty constituents in natural association with the vegetable fiber and flavoring matter of the cocoa seed; and thus avoid decomposition in and a greasy texture of the mixture, and also secure a better digestive quality, as well as a good gustatory effect in such compositions.

In further carrying out the aim of the invention, I preferably add some powdered starchy constituent to it, such as barley or wheat flours, with the aim of reducing the cost of the totally contained nutrients, and also to secure a thicker character in the composition when prepared for consumption. This addition also promotes the digestion of the milk proteids by preventing clotting in the stomach of the milk, in such large hard masses as would otherwise occur.

Although I prefer to make my product in the form of a partially dehydrated composition, I may admix in suitable proportions, dry powdered forms of cocoa with pulverized skim milk prepared by the known method of drying the milk on a highly heated roll, or otherwise produced. This form of product is of a lesser cost; but the high heat of the process coagulates the proteids of the milk and renders them more difficult of digestion, and it takes a longer time to prepare the completely dried product for table consumption.

My method of drying as indicated in Patent No. 1,127,778, is preferable, but is more costly. My method of incorporating the ingredients in the fluid form, partially dehydrating them under reduced atmospheric pressure, and then hermetically sealing the same in sheet metal incasements, is the most costly of the several methods; but it is the best, as in its preparation for immediate use, it merely requires the addition of warm water to be prepared for consumption; and the process of dehydrating the milk under reduced atmospheric pressure preserves the wholesome quality of the milk to an extent that otherwise would not obtain. In making my food compositions, I may, and usually do add other constituents; but for hygienic reasons, I prefer not to add sugar before the product is marketed, leaving the matter of adding a sweetening ingredient, to individual consumers. It will be particularly noted that a special aim of this invention is to produce a nutritive beverage of a very low cost, as well as a composition that is edibly attractive, and of an improved hygienic quality.

In the ordinary forms in which cocoa compositions are prepared for consumption at the table, not only is whole milk generally used, containing a large butter fat content; but also, butter fat in the form of whipped cream, is generally added, which total addition of fat to an already fatty material, is dietetically objectionable. I aim to produce a composition that is designedly well balanced in its constituents of proteids, fat, and sugar to secure the best dietetic results, and in proportions that are harmoniously equivalent to those of whole milk of ordinary composition, and yet, that shall have the generally relished chocolate flavor.

I claim:

1. The method of producing the food composition herein described, which consists in, (1) skimming milk, (2) adding to the skim milk pulverized cocoa seed and a pulverized cereal, and (3) partly eliminating water from the admixed materials under a decreased atmospheric pressure.

2. The method of producing the food composition herein described, which consists in, (1) adding to skim milk a cocoa product in quantity sufficient to replace the fat skimmed from the milk by an equivalent amount of the fat contained in the cocoa preparation, (2) adding a thickening cereal to the skim milk and cocoa preparation, and (3) condensing the skim milk, cocoa preparation and thickening cereal under a lessened atmospheric pressure.

3. The method of producing the food composition herein described, which consists in, admixing skim milk, pulverized cocoa seeds and a thickening material, and eliminating water from the admixed material under a lessened atmospheric pressure.

4. As a new food composition, skim milk, pulverized cocoa seed and a pulverized cereal.

5. As a new food composition, partly dehydrated skim milk, pulverized cocoa seed and a cereal.

6. The method of producing the food composition herein described, which consists in, mixing skim milk and powdered cocoa seeds and dehydrating the admixture under decreased atmospheric pressure, whereby a thorough emulsion is secured.

7. As a new food composition skim milk, powdered cocoa seeds and a cereal.

8. As a new food composition, an emulsion of powdered cocoa seeds and skim milk, produced in a vacuum pan.

9. As a new food composition, powdered cocoa seeds and skim milk, the proportion of cocoa seeds used, comprising a fat content equal to the butter fat that was in the milk before it was skimmed.

10. As a new food composition, powdered cocoa seeds and skim milk, the fat in the powdered cocoa being retained in association with the vegetable tissue of the cocoa and in proportionate amounts substantially equaling the amount of fat removed from the milk in its skimming.

JOSEPH MOSES WARD KITCHEN.

Witnesses:
BEATRICE MIRVIS,
GEO. L. WHEELOCK.